United States Patent [19]
Cochrane et al.

[11] Patent Number: 5,954,151
[45] Date of Patent: Sep. 21, 1999

[54] WHEEL RESTRAINT SAFETY SYSTEM

[76] Inventors: John Gary Cochrane, R.R. #1 Angus, Ontario, Canada, L0M 1B0; Gordon Douglas Lee, 110 Bush Street, Box 656, Angus Ontario, Canada, L0M

[21] Appl. No.: 08/796,585

[22] Filed: Feb. 6, 1997

[51] Int. Cl.⁶ .................................................. B60R 21/00
[52] U.S. Cl. ........................ 180/271; 116/28 R; 116/205; 280/727; 280/768; 293/126
[58] Field of Search ........................... 180/271; 280/781, 280/105, 39, 40, 656, 81.1, 124.109, 727, 762, 768, 847, 152.05, 851, 160; 70/225; 293/1, 128, 126; 116/28 R, 56, 208, 205; 73/66, 460, 121, 129, 132

[56] References Cited

U.S. PATENT DOCUMENTS

| | | |
|---|---|---|
| 3,486,797 | 12/1969 | Osborne . |
| 3,944,285 | 3/1976 | Vincent . |
| 4,445,700 | 5/1984 | Schroeder . |
| 5,608,376 | 3/1997 | Ito et al. . |

FOREIGN PATENT DOCUMENTS

| | | | |
|---|---|---|---|
| 2018648 | 12/1991 | Canada . | |
| 2118202 | 4/1995 | Canada . | |
| 258350 | 4/1928 | Italy | 280/847 |
| 184331 | 8/1922 | United Kingdom | 280/847 |

*Primary Examiner*—Eric D. Culbreth

[57] ABSTRACT

A wheel restraint safety system has a frame having a perimeter size to surround a wheel assembly, and mounted for spacing the frame about the wheel assembly. The frame has a pair of sidebars connected to a pair of end gates forming a generally rectangular outline. The end gates are hingedly connected to one of the sidebars and releasably lockable to the other of the sidebars. The gates provide access to the wheel assembly. The frame has a sensor for detecting unbalanced rotation of a wheel of the wheel assembly.

13 Claims, 3 Drawing Sheets

WHEEL RESTRAINT SAFETY SYSTEM

FIELD OF THE INVENTION

This invention relates generally to a vehicle wheel safety system. In particular, this invention relates to a wheel safety system for preventing detached wheels on a truck from escaping from the truck and flying into oncoming traffic.

BACKGROUND OF THE INVENTION

Trucks and other large vehicles have a number of wheels, typically eighteen, mounted on two or more axles. Heavy use and poor maintenance contribute to bearing failure and sheared lug nuts. In either case, a wheel may break free while the truck is in motion launching the wheel into oncoming traffic posing a severe threat to other drivers on the road. In Ontario, Canada, several highway deaths have been directly caused by a head-on collision with a runaway truck wheel.

Several devices exist that lock a wheel to a hub. to the hub. Examples of such prior art devices are found in U.S. Pat. No. 3,486,797 and U.S. Pat. No. 3,944,285.

SUMMARY OF THE INVENTION

The disadvantages of the prior art may be overcome by providing a wheel restraint safety system for early detection of imminent wheel failure and constraining a wheel in the event that the wheel has become dislodged from a wheel assembly.

It is desirable to provide a wheel safety system having sensors to detect an impending wheel failure and wheel retention means whereby a detached wheel may not fly free from a vehicle.

It is desirable that a wheel safety system be easily and economically retro-fitted to existing vehicles.

It is desirable that a wheel safety system not interfere with the normal operation and maintenance of a vehicle.

According to one aspect of the invention, there is provided a wheel restraint safety system comprising a frame having a perimeter size to surround a wheel assembly, and mounted for spacing the frame about the wheel assembly. The frame has a pair of sidebars connected to a pair of end gates forming a generally rectangular outline. The end gates are hingedly connected to one of the sidebars and releasably lockable to the other of the sidebars. The gates provide access to the wheel assembly. The frame has a sensor for detecting unbalanced rotation of a wheel of the wheel assembly.

In one aspect of the invention, there is provided a wheel safety system having a yoke assembly extending perpendicularly from either side of an axle. Sidebars are attached to the yoke assembly and extend substantially parallel to the axle. Wheel gates are attached at either end of the sidebars such that the sidebars and wheel gates surround a vehicle wheel assembly. Sensors are mounted on the sidebars and wheel gates to detect eccentric or unbalanced motion of the wheel assembly, and give prior warning of a potential wheel separation.

According to another aspect of the invention, there is provided a wheel safety system having wheel retention means surrounding a wheel assembly. The wheel retention means prevent lateral separation of a portion of the wheel assembly.

DESCRIIPTION OF THE DRAWINGS

The following is a description, by way of example only, of a preferred embodiment of a wheel safety system in accordance with the subject invention, reference being had to the accompanying drawings, in which.

DESCRIPTION OF THE INVENTION

Figure 1:
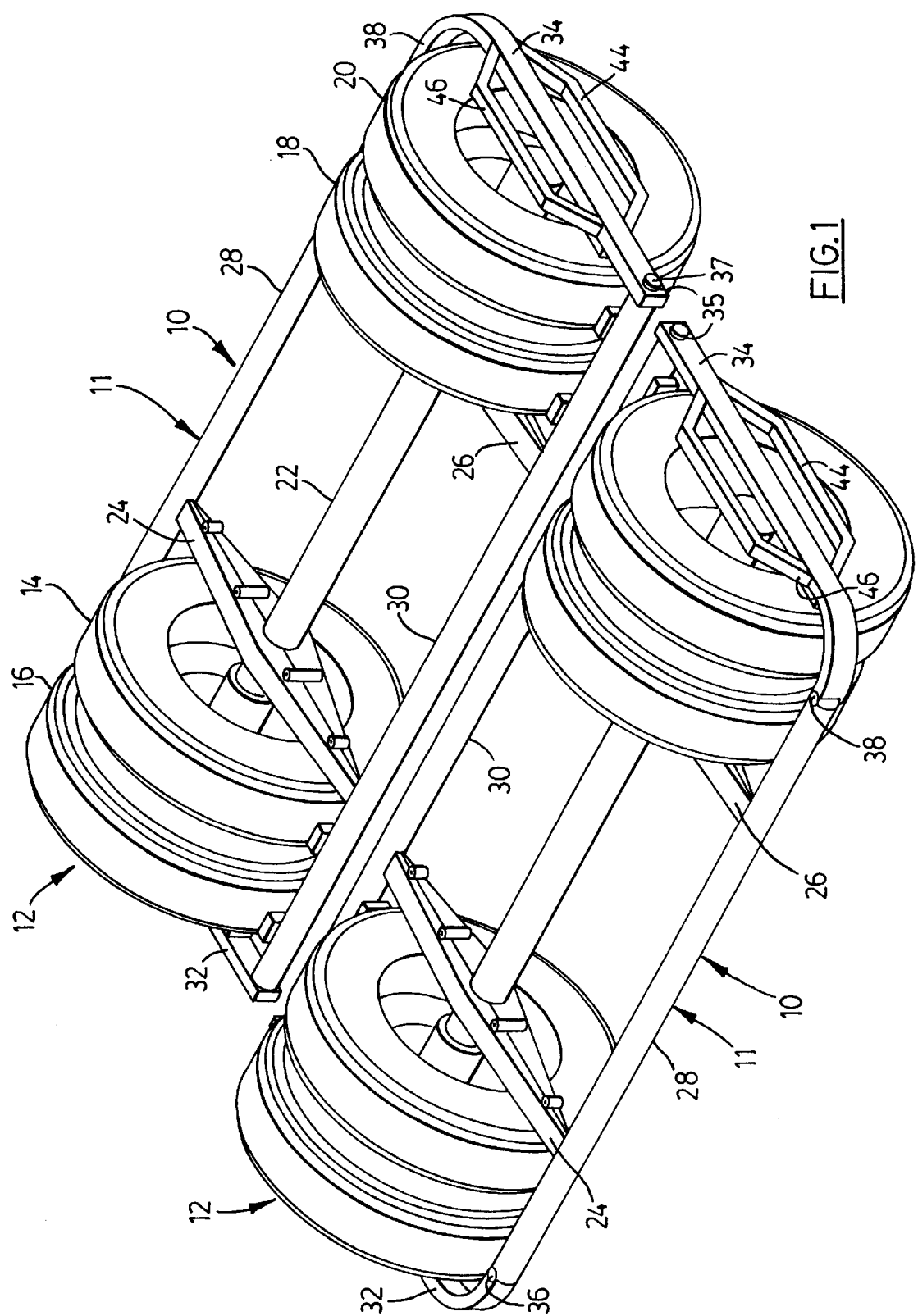
FIG. 1 is a perspective view of a wheel assembly including a wheel safety system of the present invention.
Figure 2:
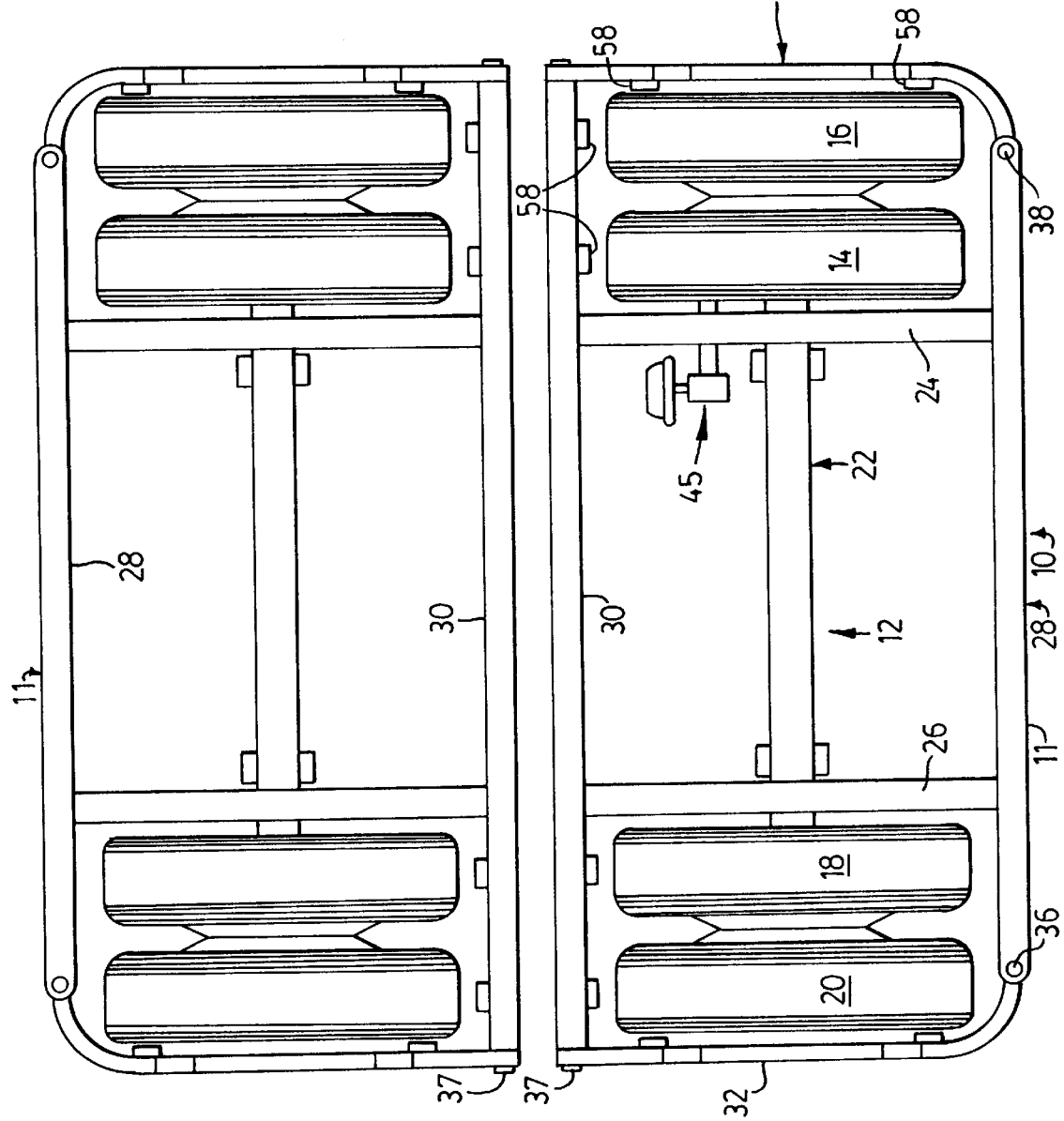
FIG. 2 is a plan view of the wheel assembly and wheel safety system of FIG. 1.

Referring to FIGS. 1 and 2, a vehicle wheel restraint safety system of the present invention is generally designated by reference numeral 10. The wheel restraint safety system 10 has a rectangular frame 11 which is spaced about and has a perimeter size to surround a wheel assembly 12. Wheel assembly 12 comprising wheels 14, 16, 18, 20 mounted on an axle 22 in a conventional manner.

The frame 11 of wheel restraint safety system 10 comprises identical yoke assemblies 24, 26 connected to sidebars 28 and 30. Yoke assemblies 24, 26 are mounted to the outer casing of axle 22 inside of wheels 14 and 18. The yoke assemblies 24, 26 preferably extend in a plane parallel to a surface on which the wheel assemblies are supported. Yoke assemblies 24, 26 extend perpendicularly to axle 22 and have a length greater than the diameter of wheels 14, 16, 18, 20. The perimeter of frame 11 is sized to extend about the wheel assembly 12 and is spaced therefrom.

Sidebar 28 is attached to one end of yoke assemblies 24, 26 such that sidebar 28 is substantially parallel to axle 22. Sidebar 30 is attached to the opposite end of yoke assemblies 24, 26, and is also substantially parallel to axle 22. Sidebars 24, 26 are preferably steel bars. Preferably sidebars 28, 30 are welded to the yoke assemblies 24, 26.

Each end of sidebar 28 has a wheel gate 32, 34 hingedly mounted thereon by hinges 36, 38. Wheel gates 32, 34 have an arcuate end and a bore 35 at an opposite end. Bore 35 engages with a bolt 37 which threadably engages a threaded bore at the end of sidebar 30. The end of sidebar 28 and bolt 37 each has a transverse aperture which is aligned for receiving a cotter pin or other suitable retainer to lock, bolt 37 therein. In a closed condition, sidebar 28, 30 and wheel gates 32, 34 present a frame or cage-like structure which encircles or surrounds wheel assembly 12. The wheel gates 32, 34 can be opened to allow routine maintenance and wheel changes.

Optionally, wheel gates 32, 34 each have braces 44 and 46 which substantially shield the hub region of wheels 16 and 20 and presents a foot rest.

A series of micro-switch sensors 58 may be mounted about the frame 11 of the wheel safety system 10. Sensors are mounted on the interior surfaces of wheel gates 32, 34 and sidebar 30 for detection of unbalanced rotation or eccentric movement, typically a wobble, of wheels 14, 16, 18, 20. The sensors 58 are electrically connected to an indicator in the vehicle operator's cab which will warn the operator of wheel misalignment and ultimately an impending catastrophic wheel failure.

Optionally, yoke assemblies 24, 26 may be fitted with displacement sensors 45 which are mounted behind the brake cylinder. As the brake shoes wear, the piston rod of the brake cylinder must travel further before the brake pads will contact the brake surface. Once a safe maximum wear has occurred, the piston rod will travel further than a specified maximum distance. The sensor 45 is positioned in the travel of the piston rod and will be triggered when the piston rod travel has exceeded the maximum. Once triggered, a signal will be displayed in the cab of the tractor to warn the driver of impending brake problems and alert the driver to adjust the brakes.

Figure 3:
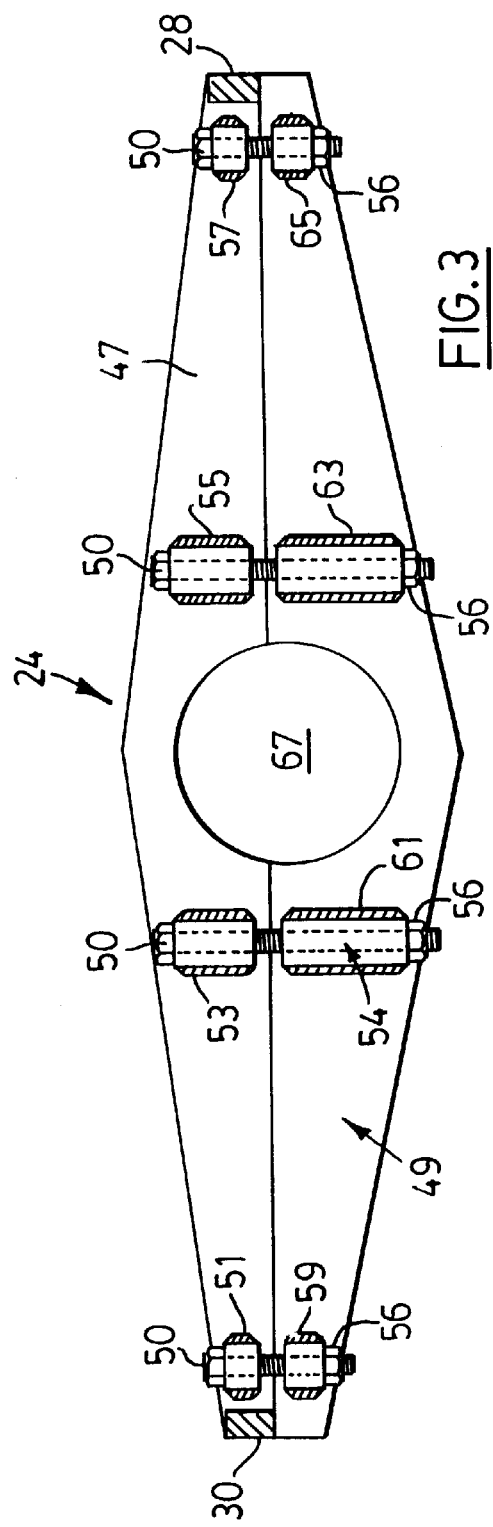
FIG. 3 is a side elevational view of a yoke assembly of the wheel safety system of FIG. 1.
Figure 4:
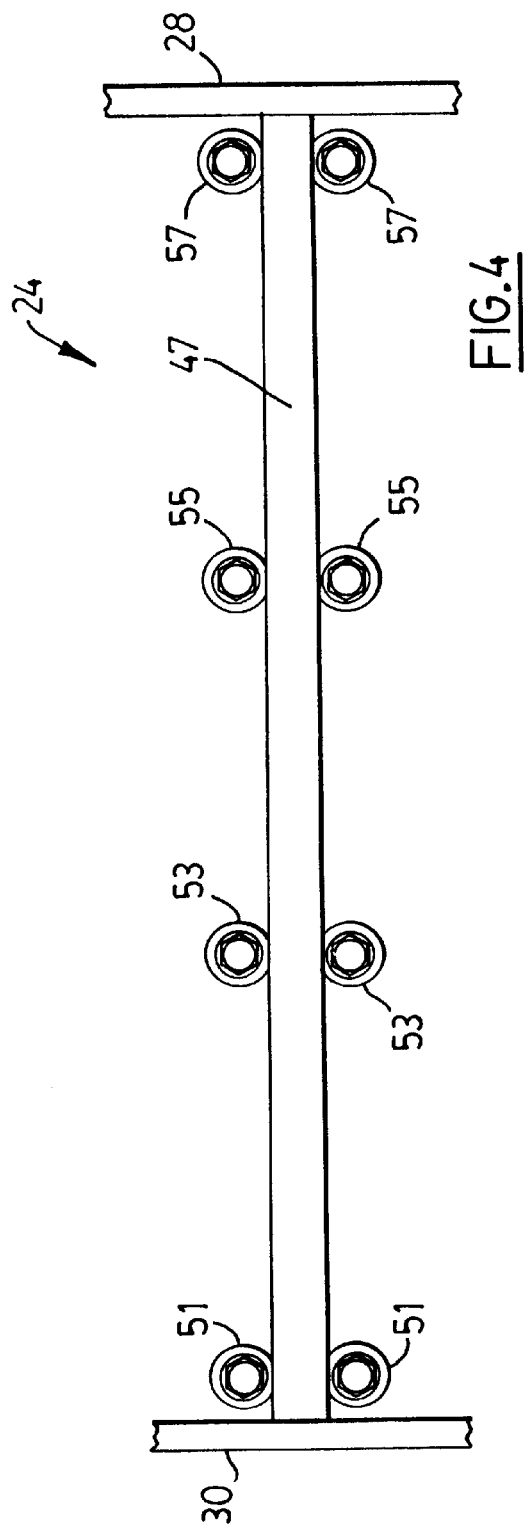
FIG. 4 is a plan view of the yoke assembly of FIG. 3.

Referring to FIGS. 3 and 4, yoke assembly 24 and 26 are each comprised of yoke portion 47 and a complementary yoke portion 49. Yoke portion 47 has notches in the ends thereof for engaging sidebars 28 and 30.

The upper yoke portion 47 has bosses or cylinders 51, 53, 55, 57 welded on each side thereof and spaced along the length thereof. Each boss or cylinder 51, 53, 55, 57 has a central bore. Similarly, lower yoke portion has bosses 59, 61, 63, 65 welded on each side and spaced along the length thereof in alignment with bosses 51, 53, 55 and 57, respectively. The upper yoke portion 47 and the lower yoke portion 49 each has a semi-circular cut-out, which when presented together present a circular opening, for clamping about the outer casing of axle 22. Upper and lower portions 47, 49 are bolted together by virtue of bolts 50 in engagement with their respective nuts 56.

The yoke assemblies 24, 26 mount the frame 11 about the wheel assembly 12. Yoke assemblies 24, 26 are a preferred means of mounting the frame 11 in position to restrain an escaping wheel. The yoke assemblies 24, 26 mount the frame 11 at about axle height and therefore do not reduce road clearance of the vehicle or trailer. Further, since the yoke assemblies 24, 26 mount onto the axle 22, the frame 11 moves with the wheel assembly 12 and thus remains relatively stationary thereto.

It is understood that other methods of mounting the frame 11 relative to the wheel assembly will now be readily apparent to those skilled in the art. Such methods include utilizing a plurality of posts extending from the underside of a trailer, with the frame 11 mounted on the ends thereof, to position the frame 11 relative to the wheel assembly 12.

Wheel gates 32, 34 and sidebars 28, 30 combine to form a frame 11 or barrier surrounding the wheels 14, 16, 18 and 20. In the event of a broken wheel studs or wheel bearing failure, the wheel restraint safety system 10 will retain a detached wheel within the confines thereof preventing the wheel from escaping from the vehicle.

It will be appreciated that the wheel restraint safety system 10 of the present invention has a number of advantages. It prevents a detached wheel from launching from a moving vehicle where it can cause serious damage to property, and injury, even death, to other vehicles and pedestrians on the road. The wheel restraint safety system 10 may be easily retro-fitted to existing vehicles at very little cost. Also, if fitted with electronic sensors 58, potential wheel problems can be detected before failure, and give an operator sufficient warning to effect repairs.

The above-described embodiment is intended to be an example of the present invention and alterations and modifications may be effected thiereto, by those of skill in the art, without departing from the scope of the invention which is defined solely by the claims appended hereto.

We claim:

1. A wheel restraint safety system comprsing:

a frame having a perimeter size to surround a wheel assembly, said wheel assembly having at least one wheel, said frame provided with at least one gate for accessing said wheel assembly, and mounting means for spacing the frame about said wheel assembly wherein said frame has a sensor for detecting unbalanced rotation of said at least one wheel.

2. A wheel restraint safety system as claimed in claim 1 wherein said system has a plurality of sensors, at least one sensor for each said at least one wheel.

3. A wheel restraint safety system as claimed in claim 2 wherein opposing ends of said frame each have a gate for providing access to said wheel assembly.

4. A wheel restraint safety system as claimed in claim 1 wherein said frame comprises a pair of sidebars connected to a pair of end gates, said frame having a generally rectangular outline.

5. A wheel restraint safety system as claimed in claim 4 wherein said end gates are hingedly connected to one of said sidebars and releasably lockable to the other of said sidebars.

6. A wheel restraint safety system as claimed in claim 4 wherein said system has a plurality of sensors, at least one sensor for each said at least one wheel.

7. A wheel restraint safety system as claimed in claim 4 wherein said frame has a sensor for detecting wear of a brake assembly of said wheel assembly.

8. A wheel restraint safety system as claimed in claim 1 wherein said mounting means engages said frame and comprises a pair of yokes for clamping onto an axle of said wheel assembly.

9. A wheel restraint safety system as claimed in claim 8 wherein said frame comprises a pair of sidebars connected to a pair of end gates, said frame having a generally rectangular outline.

10. A wheel restraint safety system as claimed in claim 9 wherein said frame has a sensor for detecting wear of a brake assembly of said wheel assembly.

11. A wheel restraint safety system as claimed in claim 8 wherein said frame has ends and each end has a gate for providing access to said wheel assembly.

12. A wheel restraint safety system as claimed in claim 8 wherein said system has a plurality of sensors, at least one sensor for each said at least one wheel.

13. A wheel restraint safety system as claimed in claim 8 wherein said frame has a sensor for detecting wear of a brake assembly of said wheel assembly.

* * * * *